US 9,942,931 B2

(12) United States Patent
Zhu et al.

(10) Patent No.: US 9,942,931 B2
(45) Date of Patent: Apr. 10, 2018

(54) BEAMFORMING

(71) Applicant: FUJITSU LIMITED, Kawasaki-shi, Kanagawa (JP)

(72) Inventors: Chenxi Zhu, Fairfax, VA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 14/908,980

(22) PCT Filed: Feb. 24, 2014

(86) PCT No.: PCT/US2014/018060
§ 371 (c)(1),
(2) Date: Jan. 29, 2016

(87) PCT Pub. No.: WO2015/016972
PCT Pub. Date: Feb. 5, 2015

(65) Prior Publication Data
US 2016/0173177 A1    Jun. 16, 2016

Related U.S. Application Data

(60) Provisional application No. 61/861,402, filed on Aug. 1, 2013.

(51) Int. Cl.
*H04W 76/02* (2009.01)
*H04W 8/00* (2009.01)
(Continued)

(52) U.S. Cl.
CPC ........ *H04W 76/023* (2013.01); *H04B 7/0456* (2013.01); *H04B 7/0617* (2013.01);
(Continued)

(58) Field of Classification Search
CPC ........... H04W 76/023; H04W 72/0406; H04W 72/0473; H04W 56/001; H04W 8/186;
(Continued)

(56) References Cited

U.S. PATENT DOCUMENTS 5,850,592 A    12/1998  Ramanathan
6,493,759 B1   12/2002  Passman et al.
(Continued)

FOREIGN PATENT DOCUMENTS

EP    2 639 994 A2    9/2013

OTHER PUBLICATIONS

U.S. Office Action issued in corresponding U.S. Appl. No. 14/909,082, dated Apr. 28, 2017.
(Continued)

*Primary Examiner* — Christine Ng
(74) *Attorney, Agent, or Firm* — Maschoff Brennan

(57) ABSTRACT

A method of beamforming a transmission from an antenna array having rows of antenna elements and columns of antenna elements may include determining a first precoding matrix associated with a first orientation. The method may further include determining a second precoding matrix associated with a second orientation. The method may further include transmitting a transmission having beamforming based at least in part on the first precoding matrix and based at least in part on the second precoding matrix.

14 Claims, 4 Drawing Sheets

(51) Int. Cl.
  *H04B 7/0456* (2017.01)
  *H04B 7/06* (2006.01)
  *H04W 4/00* (2018.01)
  *H04W 24/02* (2009.01)
  *H04W 74/00* (2009.01)
  *H04W 28/04* (2009.01)
  *H04W 52/24* (2009.01)
  *H04W 72/04* (2009.01)
  *H04W 8/18* (2009.01)
  *H04W 56/00* (2009.01)
  *H04W 72/10* (2009.01)

(52) U.S. Cl.
  CPC .......... *H04B 7/0639* (2013.01); *H04W 4/005* (2013.01); *H04W 8/005* (2013.01); *H04W 8/186* (2013.01); *H04W 24/02* (2013.01); *H04W 28/048* (2013.01); *H04W 52/241* (2013.01); *H04W 52/242* (2013.01); *H04W 52/243* (2013.01); *H04W 56/001* (2013.01); *H04W 72/042* (2013.01); *H04W 72/0406* (2013.01); *H04W 72/0413* (2013.01); *H04W 72/0446* (2013.01); *H04W 72/0473* (2013.01); *H04W 72/10* (2013.01); *H04W 74/006* (2013.01)

(58) Field of Classification Search
  CPC ............... H04W 72/10; H04W 72/042; H04W 72/0446; H04W 72/0413; H04W 52/242; H04W 52/241; H04W 28/048; H04W 74/006; H04W 52/243; H04W 4/005; H04W 24/02; H04W 8/005; H04B 7/0639; H04B 7/0617; H04B 7/0456
  See application file for complete search history.

(56) References Cited

U.S. PATENT DOCUMENTS

| | | | |
|---|---|---|---|
| 6,711,409 | B1 | 3/2004 | Zavgren, Jr. et al. |
| 7,978,631 | B1 | 7/2011 | Abdelaziz et al. |
| 8,355,736 | B2 | 1/2013 | Mitra et al. |
| 2006/0045130 | A1 | 3/2006 | Kim et al. |
| 2007/0010270 | A1 | 1/2007 | Dillon |
| 2007/0165569 | A1 | 7/2007 | Kaminski |
| 2007/0254643 | A1 | 11/2007 | Garcia et al. |
| 2008/0253327 | A1 | 10/2008 | Kohvakka et al. |
| 2009/0034432 | A1 | 2/2009 | Bonta et al. |
| 2009/0160707 | A1 | 6/2009 | Lakkis |
| 2010/0075689 | A1 | 3/2010 | Uemura et al. |
| 2010/0093364 | A1 | 4/2010 | Ribeiro |
| 2010/0148940 | A1 | 6/2010 | Gelvin et al. |
| 2010/0291962 | A1 | 11/2010 | Kim et al. |
| 2010/0303034 | A1* | 12/2010 | Chen ............ H04L 5/0023 370/329 |
| 2011/0032909 | A1 | 2/2011 | Park et al. |
| 2011/0081901 | A1 | 4/2011 | Moulsley et al. |
| 2011/0151887 | A1 | 6/2011 | Hakola |
| 2011/0319097 | A1 | 12/2011 | Wirola |
| 2012/0021704 | A1 | 1/2012 | Chan et al. |
| 2012/0129540 | A1 | 5/2012 | Hakola et al. |
| 2012/0236909 | A1* | 9/2012 | Ma ............ H04B 7/0413 375/146 |
| 2013/0138792 | A1 | 5/2013 | Preden et al. |
| 2013/0279443 | A1 | 10/2013 | Imagawa et al. |
| 2013/0308714 | A1* | 11/2013 | Xu ............ H04B 7/0417 375/267 |
| 2013/0308715 | A1* | 11/2013 | Nam ............ H04B 7/0469 375/267 |
| 2014/0098759 | A1 | 4/2014 | Noh et al. |
| 2014/0098761 | A1 | 4/2014 | Lee et al. |
| 2014/0177683 | A1* | 6/2014 | Krishnamurthy .... H04B 7/0469 375/219 |
| 2014/0328329 | A1 | 11/2014 | Novlan et al. |
| 2014/0376458 | A1 | 12/2014 | Ryu et al. |
| 2015/0016312 | A1 | 1/2015 | Li et al. |
| 2015/0173105 | A1 | 6/2015 | Bergstrom et al. |
| 2015/0223279 | A1 | 8/2015 | Jiao et al. |
| 2015/0257173 | A1 | 9/2015 | You et al. |
| 2015/0296518 | A1 | 10/2015 | Yi et al. |
| 2015/0359004 | A1 | 12/2015 | Xu et al. |
| 2016/0142981 | A1 | 5/2016 | Yi et al. |
| 2016/0150570 | A1 | 5/2016 | Wang et al. |

OTHER PUBLICATIONS

U.S. Office Action issued in corresponding U.S. Appl. No. 14/909,077, dated May 22, 2017.

U.S. Office Action issued in corresponding U.S. Appl. No. 14/909,080, dated Jun. 22, 2017.

U.S. Office Action issued in corresponding U.S. Appl. No. 14/909,082, dated Nov. 10, 2016.

Advisory Action issued in related U.S. Appl. No. 14/909,082, dated Aug. 10, 2017.

U.S. Office Action issued in U.S. Appl. No. 14/908,858, dated Sep. 15, 2017.

U.S. Office Action issued in U.S. Appl. No. 14/908,974, dated Sep. 6, 2017.

U.S. Office Action issued in U.S. Appl. No. 14/909,082, dated Sep. 15, 2017.

U.S. Office Action dated Jan. 23, 2018 in U.S. Appl. No. 14/908,974.

* cited by examiner

BEAMFORMING

FIELD

The embodiments discussed herein are related to beamforming.

BACKGROUND

Telecommunication systems may include base stations having one or more array antennas. The phase and relative amplitude of a transmission may be manipulated at the individual antenna elements of the array antennas to change the directionality of the transmission.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of beamforming a transmission from an array antenna having rows of antenna elements and columns of antenna elements may include determining a first precoding matrix associated with a first orientation. The method may further include determining a second precoding matrix associated with a second orientation. The method may further include transmitting a transmission having beamforming based at least in part on the first precoding matrix and based at least in part on the second precoding matrix.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Embodiments of the present invention will be explained with reference to the accompanying drawings.

Figure 1:
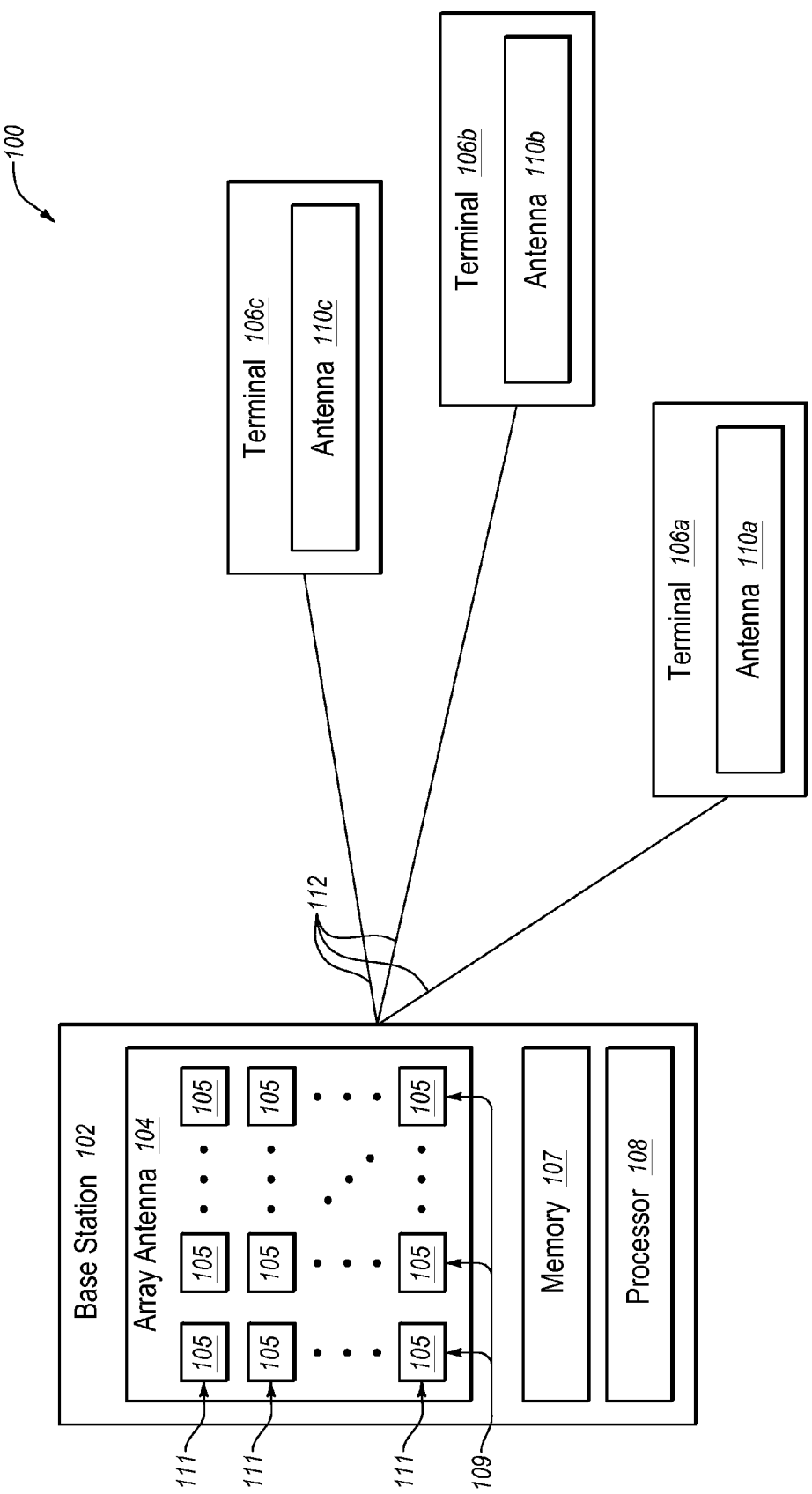
FIG. 1 is a diagrammatic view of an example telecommunication network.

FIG. 1 is a diagrammatic view of an example telecommunication system 100, arranged in accordance with at least one embodiment described herein. In some embodiments, a network architecture of the telecommunication system 100 may include the network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The telecommunication system 100 may include a base station 102. The base station 102 may include base station equipment, including hardware and/or software for radio communication with radio-communication-equipped nodes ("wireless nodes") which may be described herein as devices. For example, the base station 102 may include an array antenna 104. The array antenna 104 may include antenna elements 105 arranged in columns 109 and rows 111.

The array antenna 104 may be equipped for radio communication with devices such as terminal 106a, terminal 106b, and terminal 106c (collectively "terminals 106"). The base station 102 may generally allow the wireless nodes, including the terminals 106, to wirelessly communicate with each other and/or to wirelessly access a network (not shown) via radio communication 112 with the base station 102.

The base station 102 may include hardware and/or software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12. The base station 102 may include an E-UTRAN NodeB (eNB) associated with LTE radio access networks.

The base station 102 may include memory 107 and a processor 108. The memory 107 may include a non-transitory computer-readable medium. Instructions such as programming code executable by the processor 108 may be encoded in the memory 107. In response to the instructions being executed by the processor 108, the base station 102 may perform operations related to and/or including the processes described herein.

The terminals 106 may include equipment configured to allow the terminals 106 to transmit and receive data via wireless communications via the licensed spectrum. For example, the terminals 106 may include hardware, such as an antenna 110a, an antenna 110b, and an antenna 110c (collectively "antennas 110") for transmitting and receiving radio transmissions, and codecs. In some embodiments, one or more of the antennas 110 may include multiple antenna elements (not shown).

The terminals 106 may also include memory (not shown) and processors (not shown) generally corresponding to the memory 107 and the processor 108. The terminals 106 may include mobile phones, tablet computers, laptop computers, and/or other electronic devices that may use radio communication. Alternately or additionally, the terminals 106 may include devices that employ machine-type communication (MTC). The terminals 106 may include user equipment (UE) associated with LTE radio access networks.

The terminals 106 may be physically positioned in different locations relative to the base station 102 and thus may be physically positioned in different locations relative to the array antenna 104.

In some instances, the array antenna 104 may transmit transmissions having beamforming such that the transmissions may be efficiently received by the terminals 106. As used herein, beamforming may include spatial multiplexing associated with LTE radio networks. Performing beamforming may include estimating channels between the array antenna 104 and the terminals 106. In some instances, reference symbols may be transmitted to the terminals 106 such that the terminals may estimate the channels. It may be challenging to estimate channels to the terminals 106 by assigning a separate reference symbol to each antenna element 105 of the array antenna 104. For example, if the array antenna 104 includes a large number of antenna elements 105, an equally large number of reference symbols may be employed.

In time-division duplex (TDD), an uplink (UL) sounding reference signal (SRS) may be used in place of or in addition to reference symbols for estimation of transmission channels. An equivalent signal may not be available for channel estimation in frequency-division duplex (FDD).

Figure 2:
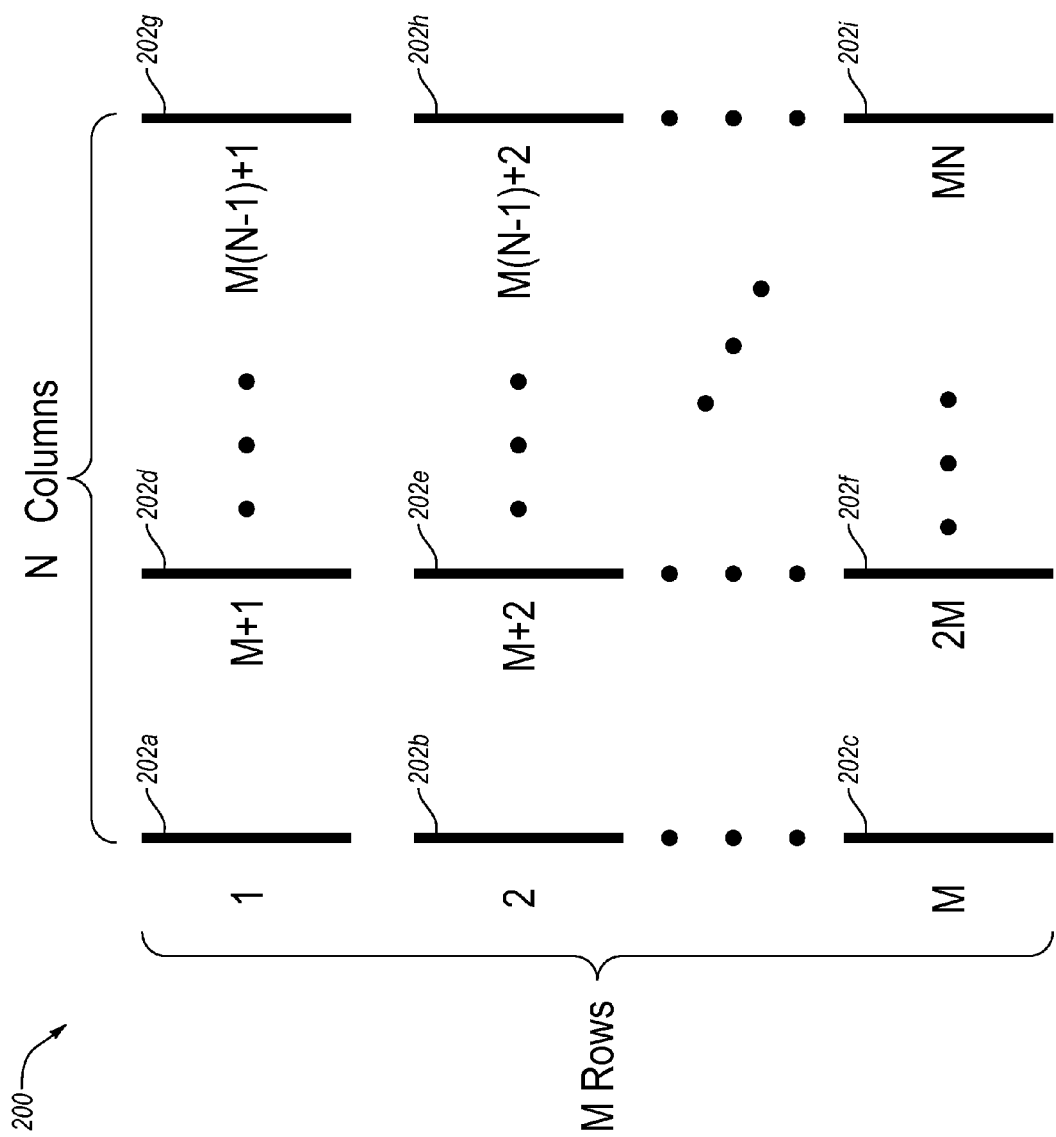
FIG. 2 is a diagrammatic view of an example uniform linear array antenna.

FIG. 2 is a diagrammatic view of an example uniform linear array antenna 200. In some instances, the uniform linear array antenna 200 may be employed as the array antenna 104 of FIG. 1. The uniform linear array antenna 200 may include antenna elements 202a through 202i (collectively "antenna elements 202") arranged in M rows and N columns. The antenna elements 202 may include a uniform polarization, as represented by the shared orientation of the antenna elements 202.

The antenna elements 202 may be numbered sequentially by column. For example, a left-most column of antenna elements 202 may be numbered 1 through M from the top antenna element 202a to the bottom antenna element 202c. The numbering scheme of the antenna elements 202 may continue left-to-right through the remaining columns.

Figure 3:
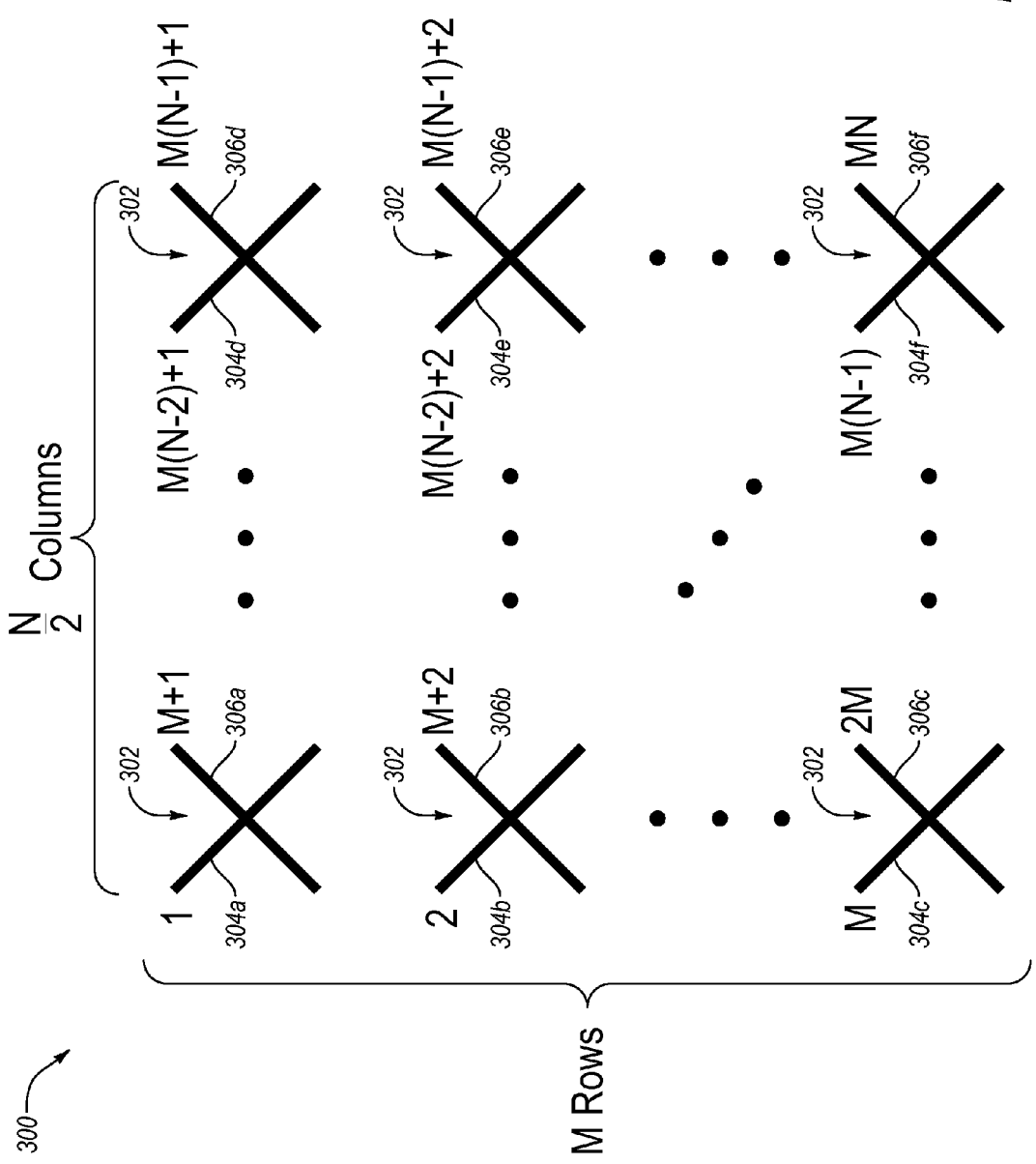
FIG. 3 is a diagrammatic view of an example dual-polarized array antenna.

FIG. 3 is a diagrammatic view of an example dual-polarized array antenna 300. In some instances, the dual-polarized array antenna 300 may be used as the array antenna 104 of FIG. 1. The dual-polarized array antenna 300 may include M rows and N/2 columns of dual-polarized antenna element pairs 302. Each of the dual-polarized antenna element pairs 302 may include first antenna elements 304a through 304f (collectively "first antenna elements 304") with a first polarization and second antenna elements 306a through 306f (collectively "second antenna elements 306") with a second polarization, as represented by the shape of the antenna element pairs 302. The dual-polarized array antenna 300 may be represented as an array antenna 300 having M rows and N columns of first and second antenna elements 304 and 306, with each column of dual-polarized antenna element pairs 302 being represented as both a column of the first antenna elements 304 and a column of the second antenna elements 306.

The first and second antenna elements 304 and 306 of the antenna element pairs 302 may be numbered sequentially, first by the first antenna elements 304 and then by the second antenna elements 306 of the same column. For example, the first antenna elements 304 of a left-most column of antenna element pairs 302 may be numbered 1 through M from the top first antenna element 304a to the bottom first antenna element 304c, where M represents the number of rows in the array antenna 300. The second antenna elements 306 of the left-most column of antenna element pairs 302 may be numbered M+1 through 2M from the top second antenna element 306a to the bottom second antenna element 306b. The numbering scheme of the first and second antenna elements 304 and 306 may continue left-to-right through the remaining columns.

Formulae and descriptions set forth herein may refer to the antenna element numbering schemes set forth in FIG. 2 and FIG. 3. However, a different numbering scheme may be used in other embodiments.

Figure 4:
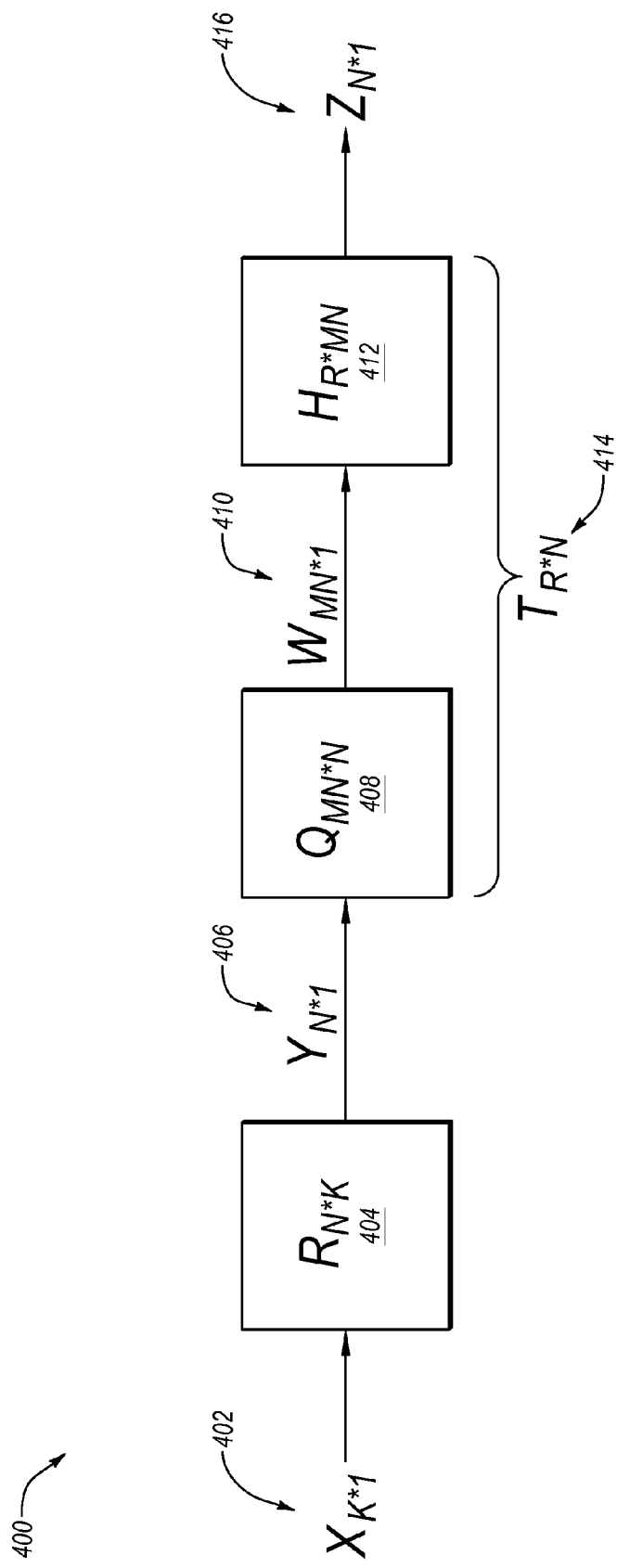
FIG. 4 is a flowchart of an example beamforming model.

FIG. 4 is a flowchart of an example beamforming model 400. In some instances, an array antenna such as the array antenna 104 of FIG. 1, the uniform linear array antenna 200 of FIG. 2, and/or the dual-polarized array antenna 300 of FIG. 3 may experience different scattering environments in the orientation of antenna element columns than in the orientation of antenna element rows. As set forth herein, the orientation of the antenna element columns may be described as a vertical orientation. The orientation of the antenna element rows may be described herein as a horizontal orientation.

In some instances, the vertical orientation may generally correspond to an approximately vertical direction relative to the earth. In some instances, the horizontal orientation may generally correspond to a horizontal direction relative to the earth.

The beamforming model 400 may describe a beamforming model for an array antenna having MN antenna elements, arranged in N columns and M rows. For example, the beamforming model 400 may be used with the uniform linear array antenna 200 of FIG. 2 and/or the dual-polarized array antenna 300 of FIG. 3.

In some instances, the scattering environment in the vertical orientation may be different from the scattering environment in the horizontal orientation. For example, the horizontal orientation may experience more scattering and more spatial diversity than the vertical orientation. In some embodiments, each column of antenna elements of an array antenna may experience similar channels as a result of relatively simple scattering environments in the vertical orientation. In some instances, a single column of antenna elements may be used to perform channel estimation in the vertical orientation. Alternately, multiple columns of antenna elements may be used for channel estimation in the vertical orientation. The same or similar vertical beamforming may be applied to multiple columns of antenna elements of an array antenna.

Beamforming in the vertical orientation may tilt transmissions at various angles in the vertical orientation towards one or more terminals generally corresponding to the terminals 106 of FIG. 1. In some instances, angular separation of the transmissions may provide for terminal separation in the vertical orientation. Orthogonal cover code (OCC) may be employed to further enhance orthogonality of the angularly separated transmissions.

Separate beamforming may be applied in the vertical orientation and horizontal orientation. In some embodiments, the antenna element rows of the array antenna may be employed for spatial multiplexing to one or more antenna elements of one or more terminals. For example, transmissions from antenna element rows of the array antenna may be beamformed for single-user multiple-input multiple-output (SU-MIMO) antenna processing and/or multiple-user multiple-input multiple-output (MU-MIMO) antenna processing. The one or more antenna elements may generally correspond to the antenna elements set forth with reference to the antennas 110 of FIG. 1. In some embodiments, the array antenna may employ horizontal beamforming similar to or the same as horizontal beamforming associated with LTE radio access network standards such as standards releases 8, 10, 11, and/or 12.

The beamforming model 400 may use R to represent the number of antenna elements of the one or more terminals to which the array antenna may transmit. In some embodiments, the beamforming model 400 may allow an array antenna to transmit to one or more terminals as an N-transmitter, R-receiver multiple-input multiple-output (MIMO) system, where N may represent the number of columns of antenna elements of the array antenna.

Transmission signals 402 may be represented by $X_{K*1}$, where K represents a transmission rank. The transmission signals 402 may be subjected to horizontal precoding 404, represented by a horizontal precoding matrix $R_{N*K}$. The contents of the horizontal precoding matrix $R_{N*K}$ may be determined based on feedback from the terminals, which may be described below.

The horizontal precoding 404 of the transmission signals 402 may result in virtual one-dimensional signals 406, represented by $Y_{N*1}$. The virtual one-dimensional signals 406 may be further subjected to vertical precoding 408, represented by a vertical precoding matrix $Q_{MN*N}$. The vertical precoding matrix $Q_{MN*N}$ may be determined based on feedback from the terminals, as described in more detail below.

In some embodiments, the vertical precoding matrix $Q_{MN*N}$ may be defined as set forth in the following Formula 1.

$$Q_{MN*N} = \begin{bmatrix} Q^{(1)}_{M*N} \\ Q^{(2)}_{M*N} \\ \vdots \\ Q^{(N)}_{M*N} \end{bmatrix} \quad \text{Formula 1}$$

The $Q_{M*N}^{(i)}$ terms of Formula 1 may represent a vertical precoding submatrix for an antenna column i of the array antenna. In some instances, the matrix $Q_{M*N}^{(i)}$ may be defined as set forth in the following Formula 2.

$$Q_{M*N}^{(i)} = \begin{bmatrix} q_{(i-1)M+1,1} & \cdots & q_{(i-1)M+1,N} \\ \vdots & \ddots & \vdots \\ q_{iM,1} & \cdots & q_{iM,N} \end{bmatrix} \quad \text{Formula 2}$$

In some embodiments, the vertical precoding 408 may be performed independently for different columns. By way of example, a signal, represented by $y_i$, may be transmitted by the antenna elements of a column i of the array antenna. The vector $V^{(i)}$ may represent a vertical precoding vector of column i. In some instances, the matrix $Q_{M*N}^{(i)}$ may be defined as set forth in the following Formula 3, with $0_{a*b}$ representing a zero matrix of size a*b.

$$Q_{M*N}^{(i)} = [0_{M*(i-1)} V(i) \, 0_{M*(N-i)}] \quad \text{Formula 3}$$

The vertical precoding 408 of the one-dimensional signals 406 may result in a two-dimensional signal 410, represented by a matrix $W_{MN*1}$. The two-dimensional signal 410 may be an M×N signal. The matrix $W_{MN*1}$ may be defined as set forth in the following Formula 4.

$$W_{MN*1} = \begin{bmatrix} W^{(1)}_{M*1} \\ \vdots \\ W^{(N)}_{M*1} \end{bmatrix} = \begin{bmatrix} Q^{(1)}_{M*1} V_{N*1} \\ \vdots \\ Q^{(N)}_{M*1} V_{N*1} \end{bmatrix} Y_{N*1} \quad \text{Formula 4}$$

A signal, represented by $W^{(i)}$, transmitted by antenna elements of column i may include the vertical precoding vector $V^{(i)}$ scaled by the signal $y_i$ associated with the column i, as set forth in the following Formula 5.

$$W_{M*1}^{(i)} = Q_{M*1}^{(i)} Y_{N*1} = V^{(i)} y_i \quad \text{Formula 5}$$

In some embodiments, the two-dimensional signal 410 may be further subjected to channel precoding 412, represented by a channel matrix $H_{R*MN}$. The channel precoding 412 may allow signals 416, represented by $Z_{N*1}$, to be spatially multiplexed between an M×N array antenna and R receiving antenna elements of the terminals in some conditions. In some instances, $Z_{N*1}$ may include data resource elements and/or physical downlink shared channel (PDSCH) transmissions with demodulation reference signals (DM-RS).

The channel matrix $H_{R*MN}$ may be defined as set forth in the following Formula 6.

$$H_{R*MN} = [H_{R*M}^{(1)} \, H_{R*M}^{(2)} \ldots H_{R*M}^{(N)}] \quad \text{Formula 6}$$

The matrix $H_{R*M}^{(i)}$ may represent a subchannel matrix from the antenna element column i of the array antenna to the R receiving antenna elements of the terminals. The matrix $H_{R*M}^{(i)}$ may be defined as set forth in the following Formula 7.

$$H_{R*M}^{(i)} = \begin{bmatrix} h_{1,(i-1)M+1} & \cdots & h_{1,iM} \\ \vdots & \ddots & \vdots \\ h_{R,(i-1)M+1} & \cdots & h_{R,iM} \end{bmatrix} \quad \text{Formula 7}$$

In some instances, the vertical precoding 408 and the channel precoding 412 may effectively form a two-dimensional channel 414 from N virtual transmitting antennas to R receiving antenna elements, represented by a matrix $T_{R*N}$. The virtual transmitting antennas may include a column of antenna elements. The matrix $T_{R*N}$ may be defined as set forth in the following Formula 8.

$$T_{R*N} = H_{R*MN} Q_{MN*N} \quad \text{Formula 8}$$

With reference again to FIG. 1, in some embodiments, the vertical precoding matrix $Q_{MN*N}$ may be determined from feedback from the terminals 106 received in response to transmitting a set of vertical reference symbols (V-RS) from one or more columns 109 of antenna elements 105 of the array antenna 104. The feedback may identify vertical precoding matrices. In some instances, the terminals 106 may provide feedback including a vertical precoding-matrix indicator (V-PMI).

By way of example, the V-RS may be transmitted from a column 109 of antenna elements 105 in the array antenna 104. The terminals 106 may receive the V-RS and may estimate a channel in the vertical orientation and may determine a precoding vector associated with the estimated channel. In some embodiments, sequences of the V-RS may be associated with channel-state information reference signals (CSI-RS) associated with LTE radio access network standards such as standards releases 10 and/or 11.

In some embodiments, the columns 109 transmitting the V-RS may be rotated to promote an identification of a V-PMI fitting multiple columns 109 of antenna elements 105. In some instances, the base station 102 may transmit a transmission including an indicator that the V-PMI is to be based on the V-RS observed over a period of time. For example, the V-RS may be transmitted from each of N columns 109 of antenna elements 105 over a particular period of time. An indicator may be transmitted that informs the terminals 106 that the V-PMI is to be based on the V-RS received over the particular period of time.

In some embodiments, the terminals 106 may estimate a rank-1 vertical precoding vector and may transmit feedback including an associated V-PMI from a vertical codebook. In some instances, a channel-quality indicator (CQI) may not be included in the feedback. In some instances, a discrete Fourier transform (DFT) based codebook may be used for determining the V-PMI. The base station 102 may have the vertical codebook stored within the memory 107.

Based on the V-PMIs received from the terminals 106 and the vertical codebook, the base station 102 may determine a vertical precoding matrix generally corresponding to the matrix $Q_{MN*N}$ of FIG. 4 to apply to transmissions from each of the columns 109 of the array antenna 104. In some instances, the base station 102 may determine a vertical precoding matrix that fits the most terminals 106.

In some instances, a vertical precoding matrix formed from a set of up to three individual vertical precoding matrices targeting up to three terminals 106 may cover most terminal-location scenarios in the vertical orientation. In some embodiments, the set of individual vertical precoding matrices may be superimposed (i.e., used in parallel) as an equivalent vertical precoding matrix for multiple terminals 106. In some embodiments, the computation of the vertical precoding matrix may be base-station-implementation dependent and may not be found directly in the vertical codebook.

Applying the vertical precoding matrix to transmissions from each of the columns 109 of the array antenna 104 may virtualize each of the antenna element 105 columns 109 as a virtual transmitting antenna.

In some embodiments, M antenna elements 105 in one of the columns 109 may transmit the V-RS as M resource symbol (RS) ports for the terminals 106 to estimate the channel $H^{(i)}$, where M may represent the number of rows of antenna elements in the array antenna 104.

A transmission from one of the columns 109 to the terminals 106 may effectively be a rank 1 transmission. A rank 1 codebook, represented by $CB_v$, may be designed for identifying vertical precoding matrices. In some embodiments, the $CB_v$ may be a DFT-based codebook and, alternately or additionally, may have a single- or double-codebook structure. In some instances, the $CB_v$ may contain codewords having different vertical resolutions for terminals 106 located in different parts of a cell associated with the base station 102. Alternately or additionally, the codebook may be a predefined one-dimensional codebook.

Each of the terminals 106 may choose a V-PMI from the $CB_v$ based on an estimation of the channel as set forth in the following Formula 9.

$$v_i = CB_v(v_i^*) = \mathrm{argmin}_{v_j \in CB_v} d_{chor}(v_j, v_i^*)$$
$$= \mathrm{argmin}_{v_j \in CB_v} |v_j + v_i^*|^2$$

The term $v_i^*$ may represent the right singular vector corresponding to a largest singular value of $H^{(i)}$, as set forth in the following Formula 10.

$$v_i^* = \mathrm{rsv}_{max}(H^{(i)}) \qquad \text{Formula 10:}$$

The function $d_{chor}(v_i, v_i^*)$ may represent chordal distance between the vectors $v_i$ and $v_i^*$.

In some embodiments, each of the columns 109 of the array antenna 104 may transmit a separate set of V-RS. The terminals 106 may estimate the V-PMI for each of the columns 109. For example, the terminals 106 may estimate $v_i^*$ for i=1. . . N. In some instances, the terminals 106 may each provide one V-PMI per column 109 as feedback.

In some embodiments, a single V-PMI, represented by v*, may be used for all columns 109. For example, a V-RS may be transmitted by one of the columns 109 of the array antenna 104 and the V-PMI provided by the terminals 106 may be used to determine one vertical precoding matrix for all columns 109.

Alternately, each of the N columns may take turns transmitting the V-RS. The base station 102 may inform the terminals 106 of the period over which the columns 109 take turns transmitting the V-RS. The terminals 106 may estimate $v_i^*$ for i=1. . . N over the period and may compute and feedback a single v* to the base station 102. The v* may be used to determine one vertical precoding matrix for all of the N columns 109.

Alternately or additionally, the terminals 106 may compute v* using the following Formula 11, in which $\sigma_i$ represents singular values corresponding to $v_i^*$.

$$v^* = \mathrm{argmin}_{v_k \in CB_v} \sum_{i=1}^{N} |\sigma_i|^2 d_{chor}^2(v_k, v_i^*) = \qquad \text{Formula 11}$$

$$\mathrm{argmax}_{v_k \in CB_v} |\sigma_i|^2 \sum_{i=1}^{N} |v_k + v_i^*|^2$$

Alternately or additionally, the terminals 106 may compute v* using the following Formula 12, omitting the singular values $\sigma_i$.

$$v^* = \mathrm{argmax}_{v_k \in CB_v} \sum_{i=1}^{N} |v_k + v_i^*|^2 \qquad \text{Formula 12}$$

Alternately or additionally, the terminals 106 may compute v* using a majority vote. For example, the terminals 106 may compute v* using the following Formula 13, in which the function $\delta(a, b)$ is 1 for a=b and 0 for a≠b.

$$v^* = \mathrm{argmax}_{v_k \in CB_v} \sum_{i=1}^{N} \delta(v_k, CB_v(v_i^*)) \qquad \text{Formula 13}$$

In response to a vertical precoding matrix being determined, the base station 102 may transmit a set of horizontal channel-state information reference symbols (H-CSI-RS). In some embodiments, the H-CSI-RS may be transmitted through the effective channel $T_{R*MN}$ including the vertical precoding matrix. The vertical precoding matrix used to vertically precode the H-CSI-RS may be transparent to the terminals 106.

Based on the H-CSI-RS, the terminals 106 may estimate a horizontal channel-state information precoding-matrix indicator (H-CSI-PMI), a horizontal channel-state information channel-quality indicator (H-CSI-CQI), and/or a horizontal channel-state information rank indicator (H-CSI-RI). The estimated H-CSI-PMI, H-CSI-CQI, and/or H-CSI-CQI may be estimated based on a horizontal codebook. The terminals 106 may feedback the estimated H-CSI-PMI, H-CSI-CQI, and/or H-CSI-CQI to the base station 102. In some embodiments, the horizontal codebook may be associated with a codebook for four or eight antenna elements associated with LTE radio access network standards such as standards releases 8, 10, and/or 11. Alternately or additionally, a new horizontal codebook may be used. The estimated H-CSI-PMI, H-CSI-CQI, and/or H-CSI-CQI may be used by the base station 102 to generate a horizontal precoding matrix generally corresponding to the matrix $R_{N*K}$ of FIG. 4.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are set forth as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of beamforming a transmission from an array antenna including rows of antenna elements and columns of antenna elements, the method comprising:
    determining a first precoding matrix associated with a first orientation;
    determining a second precoding matrix associated with a second orientation;
    transmitting a transmission including beamforming based at least in part on the first precoding matrix and based at least in part on the second precoding matrix;
    transmitting first reference symbols; and
    transmitting second reference symbols different from the first reference symbols, including beamforming based at least in part on the first precoding matrix,
    wherein:
        determining the first precoding matrix is based at least in part on a first feedback received in response to transmitting a first set of reference symbols; and
        determining the second precoding matrix is based at least in part on a second feedback received in response to transmitting a second set of reference symbols different from the first set of reference symbols, the second feedback based at least in part on a predefined one-dimensional beamforming codebook.

2. The method of claim 1, wherein:
    the first precoding matrix includes a vertical precoding matrix;
    the first orientation is associated with a column orientation of the columns of antenna elements;
    the second precoding matrix includes a horizontal precoding matrix; and
    the second orientation is associated with a row orientation of the rows of antenna elements.

3. The method of claim 1, wherein transmitting the first set of reference symbols includes transmitting the first reference symbols from one of the columns of antenna elements.

4. The method of claim 1, the method further comprising transmitting an indicator that the first feedback is to be based on the first reference symbols over a period of time, wherein transmitting the first reference symbols includes transmitting the first reference symbols from more than one of the columns of antenna elements over the period of time.

5. The method of claim 1, wherein the first feedback includes a first precoding-matrix identifier (PMI).

6. The method of claim 1, wherein the first feedback is based at least in part on a pre-defined rank-1 codebook.

7. The method of claim 1, wherein the first feedback is based at least in part on a codebook based on discrete Fourier transform (DFT).

8. The method of claim 1, further comprising determining a channel matrix.

9. The method of claim 8, further comprising estimating a composite channel including the first precoding matrix and the channel matrix.

10. The method of claim 1, wherein the transmission includes a physical downlink shared channel (PDSCH)

transmission including demodulation reference signals (DM-RS), the DM-RS having beamforming based at least in part on the first precoding matrix and based at least in part on the second precoding matrix.

11. A base station comprising:
an array antenna including rows of antenna elements and columns of antenna elements; and
a non-transitory computer-readable medium having encoded therein programming code executable by a processor to perform operations of beamforming a transmission from the array antenna, the operations comprising:
determining a first precoding matrix associated with a first orientation;
determining a second precoding matrix associated with a second orientation;
transmitting the transmission including beamforming based at least in part on the first precoding matrix and based at least in part on the second precoding matrix;
transmitting first reference symbols; and
transmitting second reference symbols different from the first reference symbols, including beamforming based at least in part on the first precoding matrix, wherein:
determining the first precoding matrix is based at least in part on a first feedback received in response to transmitting a first set of reference symbols; and
determining the second precoding matrix is based at least in part on a second feedback received in response to transmitting a second set of reference symbols different from the first set of reference symbols, the second feedback based at least in part on a predefined one-dimensional beamforming codebook.

12. The base station of claim 11, wherein:
the first precoding matrix includes a vertical precoding matrix;
the first orientation is associated with a column orientation of the columns of antenna elements;
the second precoding matrix includes a horizontal precoding matrix; and
the second orientation is associated with a row orientation of the rows of antenna elements.

13. The base station of claim 11, wherein transmitting the first set of reference symbols includes transmitting the first reference symbols from one of the columns of antenna elements.

14. The base station of claim 11, wherein:
transmitting the first reference symbols includes transmitting the first reference symbols from more than one of the columns of antenna elements over a period of time; and
the operations further comprise transmitting an indicator that the first feedback is to be based on the first reference symbols over the period of time.

* * * * *